UNITED STATES PATENT OFFICE.

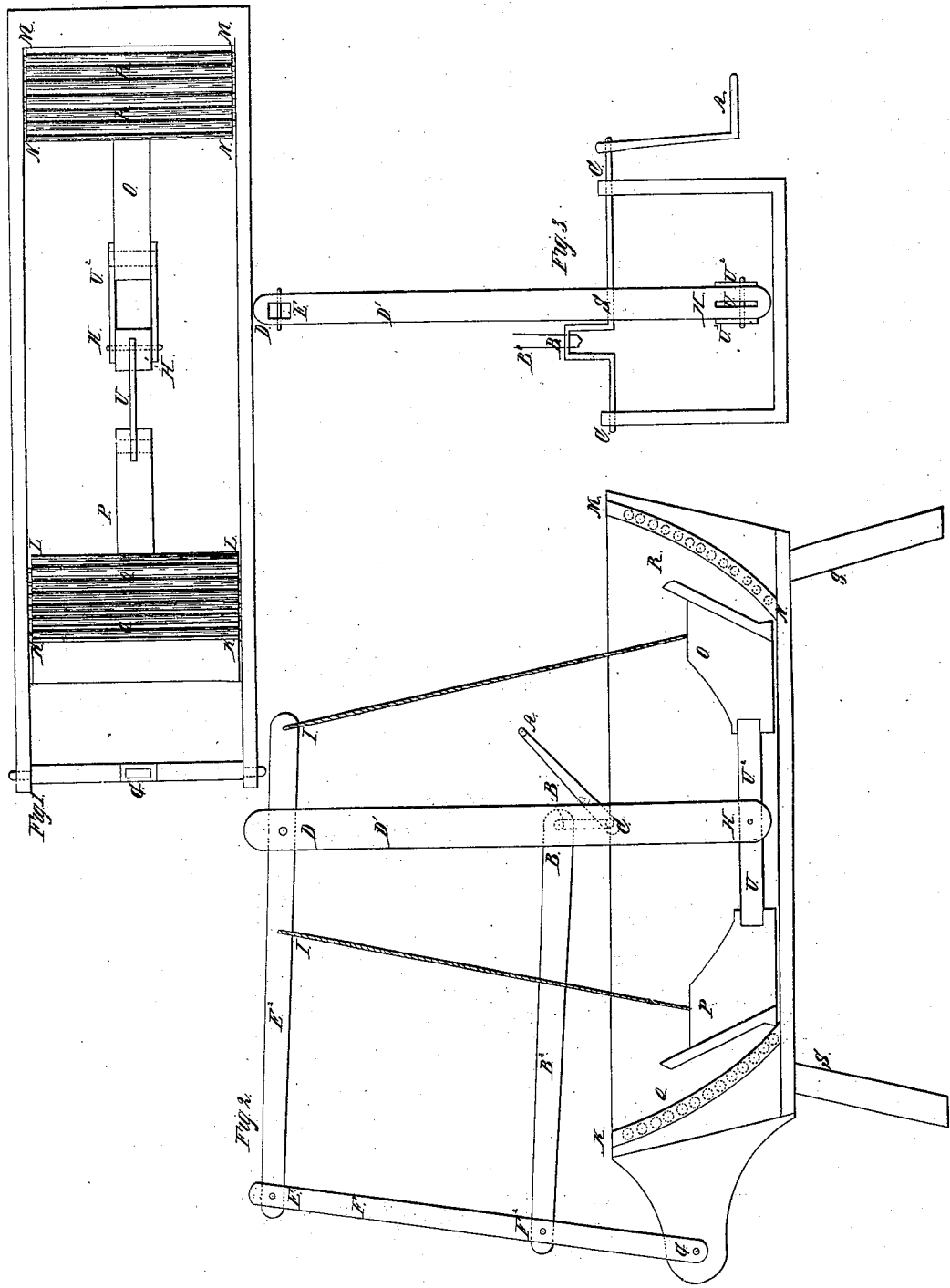

GREY UTLEY, OF CHAPEL HILL, NORTH CAROLINA.

WASHING-MACHINE.

Specification of Letters Patent No. 4,291, dated November 26, 1845.

*To all whom it may concern:*

Be it known that I, GREY UTLEY, of Chapel Hill, in the county of Orange and State of North Carolina, have invented a new and Improved Machine for Washing Clothes; and I do hereby declare that the following is a full and exact description.

The nature of my invention consists in the application to the clothes of both pressure and friction by means of rubbers and rollers, in such a manner that the clothes are thoroughly cleansed without being at all injured. By the use of a crank and lever properly combined, this operation is performed with only little labor and with great rapidity.

To enable others skilled in such subjects, to make and use my invention, I will proceed to describe its construction and operation:

The box is made water-tight 5 f. 1 in. long at top and 4 f. 2½ in. long at bottom, 20 in. wide, 16½ in. deep, all measured inside. At each end are two curved strips K, L and M, N one on each side, having holes in which turn small cylindrical rollers Q, R, 1¼ in. in diameter and 18 inches long, and placed horizontally in a regular series from bottom to top. The strips in which the rollers turn (by pivots at each end) are arcs of a circle of radius 3 f. so inclined that the foot of each shall be 7½ in. from the end of box at bottom, and the upper part in contact with the end of box at top. (See M N and K L, in Fig. 2.) The rubbers (see O and P, in Fig. 2) are made of blocks 3 in. thick 8 in. wide (or deep) the ends toward rollers cut obliquely so as to make them 16 in. long at top and 12 in. long at bottom. These ends are faced with pieces of smooth plank 9 in. wide, 20 in. long, extending across the box. Along the lower edge of the plank is nailed a strip 1¼ in. thick, well rounded and smoothed. One of the rubbers is connected with the vertical lever (see H Fig. 2) by a single stem V (let into the block at one end) and working in a mortise at lower extremity of lever H; the other rubber is connected with the same lever by a double stem (see $U^2$, Fig. 1) working on outside and both confined by the same pivot. A (Fig. 3) represents a handle to crank, C C. The crank C C' turns in grooves on the upper edge of the sides of box, half way between the ends. The crank at B is connected with a driver $B^2$ 3 f. 2 in. long, this driver is connected with a lever F at $F^2$ (Fig. 2) 14¾ in. from the axle or point G (see Figs. 1 and 2) on which the lever moves and which point is situated 3 f. 6 in. from the middle of box and 10 in. above the plane of the bottom and in a plane passing vertically through middle of box. The whole length of this lever is 3 f. 3¼ in. At the upper end it is joined by a pivot to another driver $E^2$ at E, 2 feet 10 in. long and this to a second lever D' at D. This lever is made to turn on the axle of crank (see S Fig. 3), and is connected at the lower end with the stems of the rubbers at H. Whole length of lever 3 f. 9 in.—distance from pivot at lower end to axle 14½ in. [The drivers and levers are measured between the pivot holes in the ends.]

The clothes are put into the machine with about 2 in. depth of warm water at each end of box, between the rubbers and rollers at Q and R (Fig. 2). The handle (A Fig. 3) being turned gives motion to crank C C, which by means of driver B F (Fig. 2) acts upon the lever G E—this lever again sets in motion the driver E D and through it the other lever D H, which moving on axle C C (see Fig. 3) drives the rubbers alternately toward each end of box. The clothes being interposed between the rubbers and rollers, when pressed by the rubbers move along the surface of the rollers toward the top of the box. The motion being at first horizontal the pressure upon the clothes is considerable while the rollers (turning easily upon their pivots) afford as much friction as is desirable and no more. Further, as the rubber recedes the clothes follow it, taking naturally a rolling motion, and at each successive stroke their position is varied—until after a few strokes they are brought into a compact roll. They are then easily unwrapped by the hand and subjected to the same process until well cleaned.

In the drawing (Fig. 2) the driver E D is represented as extended to I 9 in. From this and another point 9 inches on the opposite side of the vertical lever D, H the rubbers may be suspended by cords I so as to prevent unnecessary friction.

What I claim as my invention and desire to secure by Letters Patent is—

The manner of attaching the pressers O, P to the levers $D^1$, and $E^2$ by the rods U and $U^2$ and cords I so as to produce the effect above stated.

GREY UTLEY.

Witnesses:
WM. P. ELLIOT,
D. C. RANCE.